(12) United States Patent
Zhuge et al.

(10) Patent No.: US 12,026,896 B2
(45) Date of Patent: Jul. 2, 2024

(54) METHOD AND APPARATUS FOR DISPLAYING OBJECT IN VIDEO, AND ELECTRONIC DEVICE AND COMPUTER READABLE STORAGE MEDIUM

(71) Applicant: BEIJING BYTEDANCE NETWORK TECHNOLOGY CO., LTD., Beijing (CN)

(72) Inventors: Jingjing Zhuge, Beijing (CN); Guangyao Ni, Beijing (CN); Hui Yang, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 17/751,795

(22) Filed: May 24, 2022

(65) Prior Publication Data
US 2022/0284597 A1    Sep. 8, 2022

Related U.S. Application Data

(63) Continuation of application No. PCT/CN2020/129842, filed on Nov. 18, 2020.

(30) Foreign Application Priority Data

Nov. 29, 2019  (CN) .......................... 201911196331.6

(51) Int. Cl.
*G06T 7/246* (2017.01)
*G06T 7/215* (2017.01)
(Continued)

(52) U.S. Cl.
CPC .............. *G06T 7/246* (2017.01); *G06T 7/215* (2017.01); *G06V 20/46* (2022.01); *G06V 40/28* (2022.01);
(Continued)

(58) Field of Classification Search
CPC ......... G06T 7/246; G06T 7/215; G06T 13/00; G06V 20/46; G06V 40/28; G06V 10/82;
(Continued)

(56) References Cited

U.S. PATENT DOCUMENTS 6,722,987 B2    4/2004  Orr et al.
6,756,984 B1    6/2004  Miyagawa
(Continued)

FOREIGN PATENT DOCUMENTS

CN    104780339 A     7/2015
CN    104967893 A    10/2015
(Continued)

OTHER PUBLICATIONS

First Office Action dated Sep. 18, 2021 for CN Application No. 201911196331.6 with English translation (17 pages).
(Continued)

*Primary Examiner* — Kenny A Cese (57) ABSTRACT

Disclosed in embodiments of the present disclosure are a method and apparatus for displaying an object in a video, and an electronic device and a computer readable storage medium. The method for displaying an object in a video comprises: obtaining and displaying a video acquired by a photographing element; and in response to detecting that a first target action appears in the video, displaying a generation process of the target object in the video on the basis of the display position of the first target action in the video, wherein the generation process of the target object comprises: the target object appears at the display position and changes from small to large.

11 Claims, 4 Drawing Sheets

(51) Int. Cl.
*G06V 10/82* (2022.01)
*G06V 20/40* (2022.01)
*G06V 40/20* (2022.01)
*H04N 21/4223* (2011.01)
*H04N 21/431* (2011.01)
*H04N 21/44* (2011.01)
*H04N 21/4788* (2011.01)
*H04N 21/81* (2011.01)

(52) U.S. Cl.
CPC .......... *G06V 10/82* (2022.01); *H04N 21/4223* (2013.01); *H04N 21/4312* (2013.01); *H04N 21/44008* (2013.01); *H04N 21/4788* (2013.01); *H04N 21/8146* (2013.01)

(58) Field of Classification Search
CPC ......... H04N 21/44008; H04N 21/4788; H04N 21/4312; H04N 5/2621; H04N 21/4223; H04N 21/8146
USPC ........................................................... 382/107
See application file for complete search history.

(56) References Cited

U.S. PATENT DOCUMENTS

| | | | |
|---|---|---|---|
| 9,390,500 | B1 | 7/2016 | Chang et al. |
| 10,620,713 | B1* | 4/2020 | Ng ........................ G06N 3/048 |
| 2009/0015559 | A1* | 1/2009 | Day .................... G06F 3/04812 |
| | | | 345/167 |
| 2010/0245651 | A1* | 9/2010 | Minamino ................ G06T 3/40 |
| | | | 348/333.12 |
| 2011/0001709 | A1* | 1/2011 | Wang .................. G06F 3/04883 |
| | | | 345/173 |
| 2011/0215950 | A1* | 9/2011 | Wagner .............. G01C 21/3697 |
| | | | 340/995.14 |
| 2013/0128121 | A1* | 5/2013 | Agarwala ............ G11B 27/031 |
| | | | 348/E5.077 |
| 2013/0268877 | A1* | 10/2013 | Han .................... G06F 3/04845 |
| | | | 715/764 |
| 2016/0320846 | A1* | 11/2016 | De Michele ......... G06V 40/107 |
| 2017/0278304 | A1* | 9/2017 | Hildreth .............. G06F 3/04815 |
| 2018/0268609 | A1 | 9/2018 | Schneider et al. |
| 2018/0322687 | A1 | 11/2018 | Kim et al. |
| 2019/0096113 | A1 | 3/2019 | Stukalov |
| 2019/0132642 | A1 | 5/2019 | Wang et al. |
| 2020/0193206 | A1* | 6/2020 | Turkelson ............. G06F 18/214 |
| 2020/0193609 | A1* | 6/2020 | Dharur .................... G06T 7/143 |
| 2020/0285858 | A1 | 9/2020 | Xu et al. |
| 2020/0319781 | A1* | 10/2020 | Yoshida ................ G06F 3/0482 |
| 2021/0192854 | A1* | 6/2021 | Ryu .......................... G06T 7/73 |

FOREIGN PATENT DOCUMENTS

| | | |
|---|---|---|
| CN | 105578113 A | 5/2016 |
| CN | 105744206 A | 7/2016 |
| CN | 106303662 A | 1/2017 |
| CN | 106385591 A | 2/2017 |
| CN | 107341435 A | 11/2017 |
| CN | 108259496 A | 7/2018 |
| CN | 108550074 A | 9/2018 |
| CN | 108712661 A | 10/2018 |
| CN | 108833818 A | 11/2018 |
| CN | 305031922 S | 2/2019 |
| CN | 109963187 A | 7/2019 |
| CN | 109977868 A | 7/2019 |
| CN | 110069125 A | 7/2019 |
| EP | 3726843 A1 | 10/2020 |
| JP | 2001137541 A | 5/2001 |
| JP | 2007079673 A | 3/2007 |
| JP | 2009231988 A | 10/2009 |
| JP | 2013030125 A | 2/2013 |
| JP | 2013135835 A | 7/2013 |
| KR | 1020180122248 A | 11/2018 |
| WO | WO2019141126 A1 | 7/2019 |

OTHER PUBLICATIONS

Second Office Action dated Mar. 9, 2022 for CN Application No. 201911196331.6 with English translation (14 pages).
Written Opinion and Search Report dated Feb. 2, 2021 for PCT Application No. PCT/CN2020/129842 with English translation (15 pages).
Extended Search Report dated Nov. 14, 2022 in EP Application No. 20891626.2 (10 pages).
Office Action dated Jul. 4, 2023 in Japanese Application No. 2022-530155, with English translation (12 pages).
Summons to Attend Oral Proceedings issued Jan. 22, 2023 in European Application No. 20891626.2 (11 pages).
Notice of Reasons for Refusal dated Dec. 19, 2023 in Japanese Application No. 2022-530155, with English translation (6 pages).
Notice of Preliminary Rejection dated Nov. 20, 2023 in Korean Application No. 10-2022-7018357, with English translation (15 pages).

* cited by examiner

```
Device for displaying an object in a video
                    400
    ┌─────────────────────────────────────┐
    │      Video display module 401       │
    └─────────────────────────────────────┘

┌─────────────────────────────────────┐
    │   Target object display module      │
    │                402                  │
    └─────────────────────────────────────┘
```

METHOD AND APPARATUS FOR DISPLAYING OBJECT IN VIDEO, AND ELECTRONIC DEVICE AND COMPUTER READABLE STORAGE MEDIUM

CROSS-REFERENCE TO RELATED APPLICATIONS

The present disclosure is a U.S. National Stage Application under 35 U.S.C. § 111 of International Patent Application No. PCT/CN2020/129842, filed on Nov. 18, 2020, which claims the priority to China Patent Application No. 201911196331.6 filed on Nov. 29, 2019, entitled "METHOD AND APPARATUS FOR DISPLAYING OBJECT IN VIDEO, AND ELECTRONIC DEVICE AND COMPUTER READABLE STORAGE MEDIUM", the entire content of both of which are incorporated herein by reference.

TECHNICAL FIELD

The present disclosure relates to a method and a device for displaying an object in a video, an electronic device, and a computer-readable storage medium.

BACKGROUND

With the development of computer networks and the popularization of smart phones, ordinary users may no longer be satisfied with expressing their emotions only with monotonous pictures and words. Video is deeply loved by users because of its richer and more diverse content and forms and the intuitive feeling it brings, and it is gradually becoming popular. It has gradually become a trend for ordinary users to create original videos. However, on the other hand, original selfie videos are usually presented in a bland form. At the same time, we can see that the use of video special effects in film and television works is becoming more and more abundant, and the content expression forms are also more diversified. It can be said that video special effects are the support and guarantee of a successful film and television work.

SUMMARY

This summary is provided for a concise introduction of the inventive concept of the present application, which will be described in detail in the detailed description below. This summary is not intended to identify critical features or essential features of the claimed technical solution, nor is it intended to be used to limit the scope of the claimed technical solution.

In a first aspect, an embodiment of the present disclosure provides a method for displaying an object in a video, comprising: obtaining and displaying a video captured by a camera element; and displaying a generation process of a target object in the video based on a display position of a first target action in the video in response to detecting that the first target action appears in the video; wherein the generation process of the target object comprises: the target object appearing at the display position and changing from small to large.

In a second aspect, an embodiment of the present disclosure provides an device for displaying an object in a video, comprising: a video display module configured to obtain and display a video captured by a camera element; and a target object display module configured to display a generation process of a target object in the video based on a display position of a first target action in the video in response to detecting that the first target action appears in the video; wherein the generation process of the target object comprises: the target object appearing at the display position and changing from small to large.

In a third aspect, an embodiment of the present disclosure provides an electronic device, comprising: at least one processor; and a memory coupled in communication with the at least one processor; wherein the memory stores instructions executable by the at least one processor, the instructions when executed by the at least one processor causing the at least one processor to perform the method of displaying an object in a video according to any one of the embodiments in the foregoing first aspect.

In a fourth aspect, an embodiment of the present disclosure provides a non-transitory computer-readable storage medium, wherein the non-transitory computer-readable storage medium stores computer instructions used to cause a computer to execute the method of displaying an object in a video according to any one of the embodiments in the foregoing first aspect.

In a fifth aspect, an embodiment of the present disclosure provides a computer program product, comprising a computer program, which, when executed, is used to implement the method of displaying an object in a video provided by the embodiment of the present disclosure.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale.

DETAILED DESCRIPTION

Exemplary embodiments of the present disclosure will now be described in detail with reference to the accompanying drawings. Although some embodiments of the present disclosure are shown, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the method embodiments may comprise additional steps and/or some of the illustrated steps may be omitted. The scope of this disclosure is not limited in this regard.

The term "comprising" and its variants as used herein is an open-ended mode expression, that is, "comprising but not limited to". The term "based on" means "based at least in part on". The term "one embodiment" means "at least one embodiment"; the term "another embodiment" means "at least one additional embodiment"; and the term "some embodiments" means "at least some embodiments". Related definitions of other terms will be given in the following description.

It should be noted that the concepts of "first", "second" or the like mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

The inventors of the present disclosure find that current video special effects generally have fixed display effects and are not flexible enough. For example, in general, a special effect can only be displayed at a preset position in a video, or the display of a special effect can only move with an object in the video. It is impossible for a special effect to make some changes or movements by itself.

In view of this, the embodiments of the present disclosure provide a method for displaying an object in a video, so as to try to solve the technical problem in the related art that the display effect of the special effect is fixed and the special effect cannot perform some changes or movements.

Figure 1:
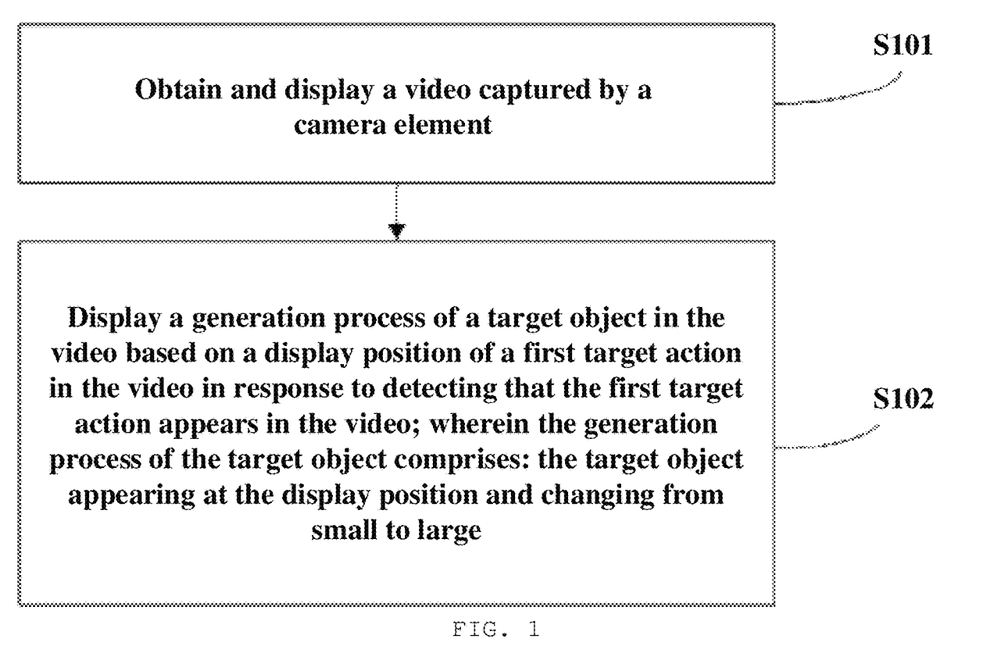
FIG. 1 is a flowchart of an embodiment of a method for displaying an object in a video provided by the present disclosure.

FIG. 1 is a flowchart of a method for displaying an object in a video provided by an embodiment of the present disclosure. The method for displaying an object in a video provided by the embodiment can be performed by an device for displaying an object in a video. The device for displaying an object in a video may be implemented as software, or as a combination of software and hardware. The device for displaying an object in a video may be integrated into a certain device in a system for displaying an object in a video, such as, a server that displays an object in a video or a terminal device that displays an object in a video. As shown in FIG. 1, the method comprises the following steps:

At step S101, a video captured by a camera element is obtained and displayed.

In the present disclosure, the camera element refers to various image sensing devices that can capture video. Exemplary camera elements are video cameras, web cameras, cameras, and so on. In the embodiment, the camera element may be a camera on a terminal device, such as a front or rear camera on a mobile phone, and the video collected by the camera is displayed on a display screen of the mobile phone. In the step, a video captured by the camera element is acquired and displayed as a display background of a target object in the present disclosure.

At step S102, a generation process of a target object is displayed in the video based on a display position of a first target action in the video in response to detecting that the first target action appears in the video; wherein the generation process of the target object comprises: the target object appearing at the display position and changing from small to large.

In the present disclosure, a first target action can be preset as a trigger condition, and when it is detected that the first target action appears in the video, the displaying of a generation process of a target object is triggered.

Optionally, the detecting of that the first target action appears in the video comprises: identifying a feature point of a target object in the video; determining a position of a specific feature point of the feature point; and determining that the first target action appears in the video in response to the position of the specific feature point conforming an expected position. Exemplarily, the first target action is pouting, the specific feature point is a feature point of a mouth, and when it is determined that a distance between the feature point of the mouth and a center point of the mouth is less than a preset value, it is determined that a pouting action performed by the mouth of the human face.

Optionally, the detecting of that the first target action appears in the video comprises: inputting the video into a pre-trained convolutional neural network, wherein the convolutional neural network is configured to identify the first target action; and determining that the first target action appears in the video in response to an output value of the convolutional neural network being greater than a judgment threshold. Exemplarily, if the first target action is pouting, various video frames comprising pouting actions can be input into the convolutional neural network to calculate errors for the convolutional neural network using a loss function, the errors are fed back to the convolutional neural network to adjust parameters of the convolutional neural network, and a convolutional neural network that can be used to identify a pouting action can be obtained after several times of training. Then, a action in the video can be determined by inputting video frames collected by the camera element into the convolutional neural network.

After the first target action is identified, the target object appearing at the display position of the first target action and changes from small to large. The display position of the first target action is a center position of a first object that makes the first target action. In an example, the target object is a mouth, and its display position is set to a center position of the mouth. In another example, the target object is an eye, and its display position is set to a center position of the eye. The target object is an object in a special effect, which is rendered at the display position in a preset manner. In the embodiment, the target object is rendered at the display position and gradually increases from small to large.

Optionally, the generation process of the target object comprises: the target object appearing at the display position of the first target action according to a first size threshold; and a size of the target object increasing from the first size threshold until the size of the target object reaching a second size threshold; wherein the first size threshold is less than the second size threshold. In an embodiment, the target object comprises a display state attribute, and the target object is rendered in the video in different states by setting different display state attribute values. Exemplarily, the display state attribute value may comprise: hiding, enlarging, moving, and disappearing. Before detecting that the first target action appears in the video, the display state attribute value is set to the hiding, and the target object will not displayed in this case; in response to detecting the first target action, the display state attribute value of the target object is set to the enlarging to display a generation process of the target object in the video. Specifically, the target object further comprises a size attribute, and a value of the size attribute determines a display size of the target object in the video. In the embodiment, two size attribute values of the target object, namely, a first size threshold and a second size threshold are obtained, respectively. The first size threshold is an initial size attribute value of the displayed target object, and the second size threshold is a maximum value of the size attribute of the target object in its enlarging state. After the first size threshold and the second size threshold are obtained, the size attribute value of the target object is changed from the first size threshold to the second size threshold in multiple frames of the video. Exemplarily, changing the size attribute value of the target object from the first size threshold to the second size threshold may comprise, starting from the first size threshold, adding a fixed increment each time, wherein the increased size attribute value is used as the size attribute value of the target object, and then rendering the target object according to the increased size attribute value in a next image fame until the size attribute value reaches the second size threshold. Exemplarily, if the target object is a bubble, when a first target action is detected, a bubble is rendered at the display position of the first target action. A first size threshold of the bubble is 0, the second size threshold of the bubble is 200 pixels, and a process of rendering a bubble with a radius that changes from 0 to 200 pixels, that is, a process of displaying a bubble that increases from small to large is displayed in the video.

Optionally, the first size threshold and the second size threshold of the size attribute of the target object are preset values, which may be preset fixed values or values calculated according to a predetermined condition. If the target object is a circle object, the initial value of its radius can be set to a fixed length of 100 pixels; or its initial value can be set to ⅕ of the length of the video, and so on.

Optionally, the first size threshold and the second size threshold of the size attribute of the target object are obtained by random calculation during acquisition, and it is only necessary to ensure that the second size threshold is greater than the first size threshold when the second size threshold is randomly acquired. In this way, when a plurality of the target objects are displayed, the effect of a plurality of target objects presented in different sizes can be achieved.

Optionally, in the step, the generation process of the target object comprises: obtaining a display position of the target object; obtaining an enlargement function, wherein the enlargement function represents a corresponding relationship between time and the size attribute value; determining a size attribute value of the target object at a current time according to the enlargement function; and rendering the target object in the video according to the display position of the target object and the size attribute value. Optionally, the enlargement function is a corresponding relationship between the time and the size attribute value, and is used to control an enlargement speed of the target object. For example, when the state attribute value of the target object is set to the enlarging, the size attribute value of the target object is increased from the first size threshold to the second size threshold within N seconds. Exemplarily, if the first size threshold is 0 and the second size threshold is M, the target object is controlled to be enlarged by M/N length units per second, so that after N seconds since that the state attribute of the target object is set to the enlarging, the size attribute value of the target object is enlarged to M. According to the display position of the target object and the enlargement function, the target object is rendered in the video image, and the target object is displayed with the effect of gradually enlarging from small to large.

It can be understood that the specific implementation of the above enlargement function is only an example, and does not constitute a limitation of the present disclosure. In fact, various enlargement methods can be used to achieve different effects.

In an embodiment, after the displaying of the generation process of the target object in the video, the method further comprises: displaying a motion process of the target object in the video; wherein the motion process of the target object comprises: the target object moving, and/or the target object rotating, and/or a size of the target object changing. In the embodiment, the state attribute value of the target object is set to the moving, and in this case, the target object moves according to a preset motion attribute value.

The moving of the target object comprises: the target object moving the display position along a first linear trajectory, wherein the first linear trajectory is determined by a first movement speed and a first movement direction. In the embodiment, the motion attribute of the target object comprises a movement direction and a movement speed. The display position of the target object in each frame of the video can be calculated according to the display position, movement direction and movement speed of the target object. Optionally, the first movement direction is a direction angle, the direction angle being an comprised angle between the movement direction and a horizontal axis. The comprised angle can take any value between 0° and 360°. The first movement speed represents a distance that the target object moves in a unit time, from which the first linear trajectory can be calculated. The first linear trajectory consists of a plurality of display positions, each display position corresponding to a display position of the target object at a certain time. Then, a corresponding display position is acquired according to a current time, and the target object is rendered at the display position. Optionally, a second display position of the target object at a next time can also be calculated according to a first display position, the first movement speed and the first movement direction of the target object at the current time, and the target object is rendered at the second display position when the next time arrives. The display position is calculated in multiple frames and the target object is rendered so that the target object exhibits a state of movement.

The rotating of the target object comprises: the target object rotating along a first rotation trajectory, wherein the first rotation trajectory is determined by a first rotation direction and a first angular velocity. In the embodiment, the rotation of the target object is the self-rotation of the target object on a display plane of the video, and the motion attribute of the target object comprises a rotation direction and an angular velocity. A rotation angle of the target object in each frame of the video can be calculated according to an initial rotation angle, a rotation direction and an angular velocity of the target object.

The rotation direction comprises clockwise rotation and counterclockwise rotation, and the angular velocity is the rotation speed of the target object, wherein the angular velocity represents a rotation angle of the target object per unit time. After the first rotation direction and the first angular velocity of the target object are determined, the first rotation trajectory can be calculated according to an initial rotation angle of the target object, and the first rotation trajectory is composed of rotation angles of the target object at various times. Then, a corresponding rotation angle is acquired according to a current time, and the target object is rotated and rendered at the display position corresponding to the current time according to the rotation angle. Optionally, a second rotation angle of the target object at a next time can also be calculated according to the first rotation angle, the first rotation direction and the first angular velocity of the target object at the current time, and the target object is rendered at the second rotation angle when the next time arrives. The rotation angle is calculated continuously in multiple frames, and the target object is rendered so that the target object exhibits a state of rotation.

The changing of the size of the target object comprises: the size of the target object changing between a third size threshold and a fourth size threshold. In the embodiment, the size attribute value of the target object is set to change between the third size threshold and the fourth size threshold. Exemplarily, the change is that the size attribute value of the target object changes from a small size to a large size and/or from a large size to a small size between the third size threshold and the fourth size threshold. Optionally, the change occurs at a preset fixed speed. For example, the size attribute value of the target object gradually changes from the third size threshold to the fourth size threshold at a fixed speed, and then gradually changes from the fourth size threshold to the third size threshold at a fixed speed. Optionally, the change is controlled by a size change control function, wherein the size change control function is a function with time as a variable, so that a size attribute value of the target object at each time can be calculated based on the size change control function. Exemplarily, the size change control function is:

$$R = R_0 + a \sin(t),$$

wherein R is the real-time size attribute value of the target object, and the value of $R_0$ is the intermediate value of the size attribute, $a \leq R_0$, t is the time elapsed after the state attribute is set to random movement. Since $-1 \leq \sin(t) \leq 1$, $R_0 - a \leq R \leq R_0 + a$. $R_0 - a$ is the third size threshold, and $R_0 + a$ is the fourth size threshold. In the example, R may represent a radius of a circular target object, which changes with time to show the effect of increasing and decreasing in size periodically.

In an embodiment, the moving of the target object further comprises: the target object switching from the first linear trajectory to a second linear trajectory to move the display position in response to the target object colliding with an edge of the video, wherein the second linear trajectory is determined by a second movement speed and a second movement direction. The rotating of the target object comprises: the target object switching from the first rotation trajectory to a second rotation trajectory for rotation in response to the target object colliding with an edge of the video, wherein the second rotation trajectory is determined by a second rotation direction and a second angular velocity. Optionally, the target object colliding with an edge of the video comprises: obtaining an edge position of the video; and determining that the target object collides with an edge of the video in response to an edge position of the target object being coincident with the edge position of the video. Exemplarily, the edges of the video are set as four straight lines represented by X=0, Y=0, X=W, Y=H, respectively. Coordinates of an edge point of the target object are calculated. If X=0 or Y=0 or X=W or Y=H in the coordinates (X, Y) of the edge point of the target object, it is determined that an edge position of the target object coincides with an edge position of the video, that is, the target object collides with an edge of the video. After the collision occurs, a new motion attribute of the target object is generated, wherein the new motion attribute comprises a second movement speed, a second movement direction, and/or a second rotation direction and a second angular velocity. Then, a display position of the target object is determined according to a second movement trajectory determined by the second movement speed and the second movement direction, and/or a rotation angle of the target object is determined according to a second rotation trajectory determined by the second rotation direction and the second angular velocity. After a collision occurs, an initial display position of the target object is a display position of the target object when the collision occurs, and the initial rotation angle of the target object is a rotation angle of the target object when the collision occurs.

In an embodiment, the method for displaying an object in a video further comprises: displaying a disappearance process of the target object in the video in response to detecting a first trigger condition. The step of displaying the disappearance process of the target object in the video may be executed after the step S102 or after the step of displaying the motion process of the target object in the video, or may be executed in parallel with the execution of step S102. That is to say, as long as the target object has been generated, regardless of in the generation process or in the subsequent motion process, when the first trigger condition is detected, a disappearance process of the target object will be displayed in the video. In the embodiment, the display state attribute value of the target object is set to the disappearing. Optionally, the displaying of the disappearance process of the target object in the video comprises: obtaining a disappearance sequence frame of the target object; playing the disappearance sequence frame in the video; and making the target object disappear from the video when the playing of the disappearance sequence frame is finished. The disappearance sequence frame of the target object is an animation. For example, the animation shows a disappearance procedure of the target object, from a complete target object to an broken target object until complete disappearance of the target object. After the disappearance sequence frame is obtained, it is played back in the video, and after the playback of the disappearance sequence frame is completed, the target object disappears from the video. Specifically, a transparency of the target object can be controlled according to a playback time length of the sequence frames. The transparency of the target object gradually increases with the playback of the disappearance sequence frame until the target object becomes completely transparent when the playing of the disappearance sequence frame is finished.

Optionally, the first trigger condition is that a time length that the target object has been displayed in the video exceeds a preset time threshold. Optionally, the display time length here is a length of time elapsed after the value of the display state attribute of the target object is set to the enlarging. Optionally, the display time length here is a length of time elapsed after the value of the display state attribute of the target object is set to the moving.

Figure 2:
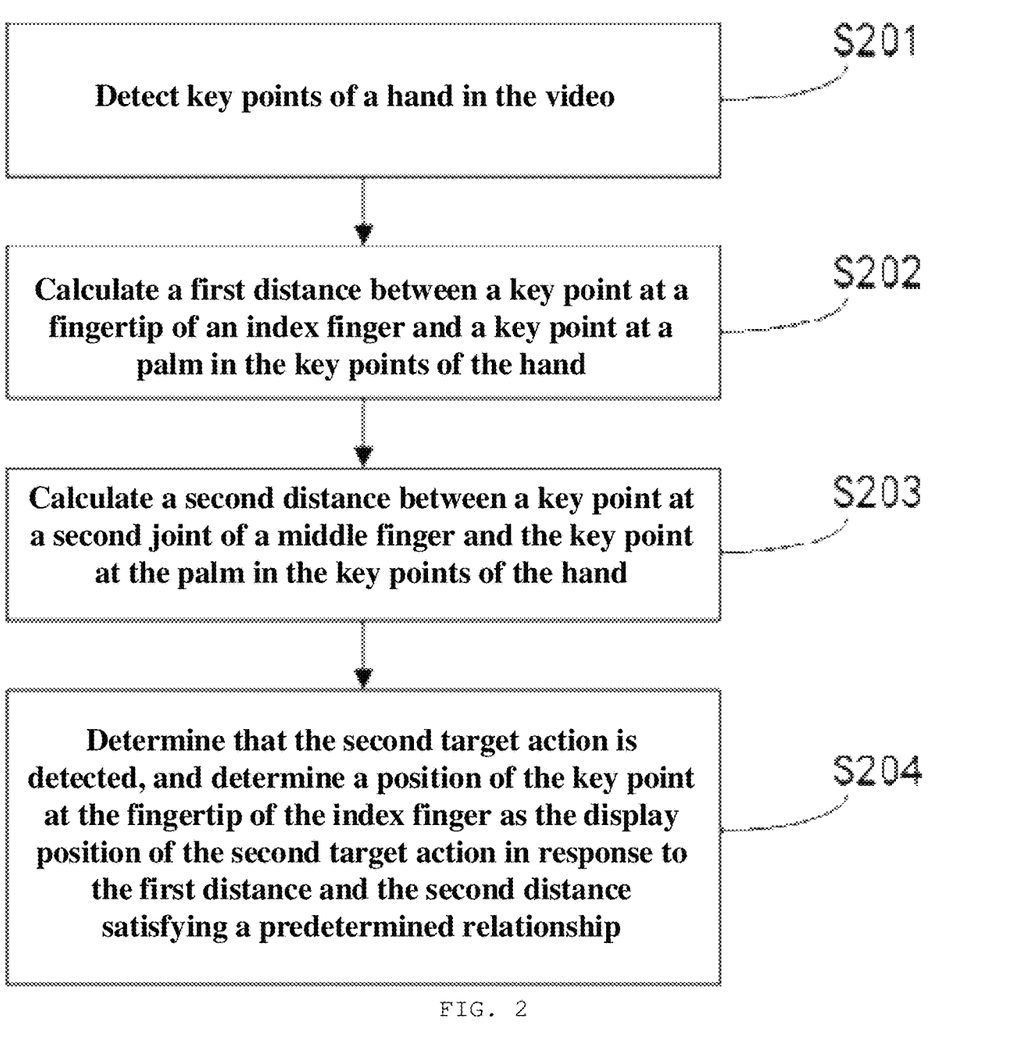
FIG. 2 is a flowchart of a specific example of determining a display position of a second target action in the embodiment of the method for displaying an object in a video provided by the present disclosure.

Optionally, the first trigger condition is that a second target action appears in the video, wherein a display position of the second target action in the video is within a display range of the target object. Exemplarily, the second target action is to stretch out an index finger, and the display position of the second target action is a position of a fingertip of the index finger. When the position of the fingertip of the index finger is within the display range of the target object, it means that the first trigger condition is detected. Further, the determining of a display position of the second target action comprises the following steps.

At step S201, key points of a hand in the video are detected.

At step S202, a first distance between a key point at a fingertip of an index finger and a key point at a palm in the key points of the hand is calculated.

At step S203, a second distance between a key point at a second joint of a middle finger and the key point at the palm in the key points of the hand is calculated.

At step S204, it is determined that the second target action is detected, and it is determined a position of the key point at the fingertip of the index finger as the display position of the second target action in response to the first distance and the second distance satisfying a predetermined relationship.

Figure 3:
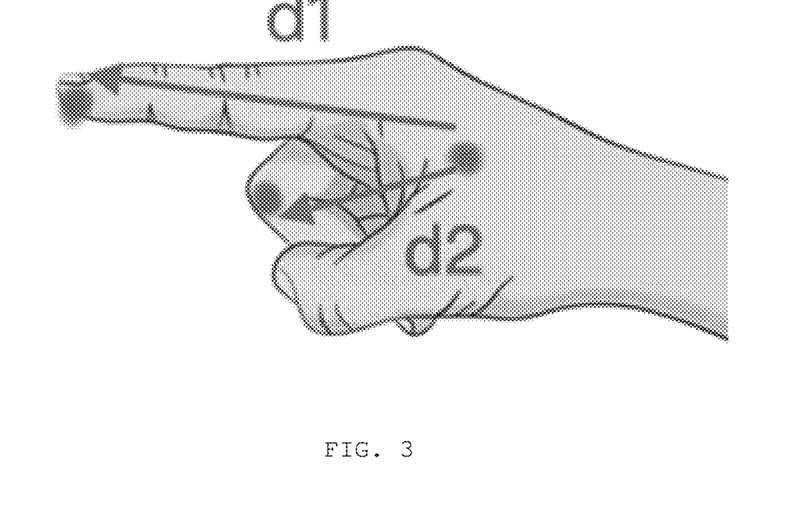
FIG. 3 is a schematic diagram of a distance d1 and a distance d2 in the embodiment of the method for displaying an object in a video provided by the present disclosure.

Optionally, in the step S201, any techniques for detecting key points of human hand can be used, such as the typical detection of key points of human hand based on deep learning, which trains a deep learning network using a training atlas annotated with key points of human hands, and then inputs an image to be detected into the deep learning network to output key points of a human hand in the image to be detected. Other techniques for detecting the key points of the human hand will not be described herein. Optionally, in the step, a general detection method can be used to detect all key points of a human hand, or a specific network can be trained for a specific scene or a specific method can be used to detect only the key points that need to be used to improve the detection efficiency. Optionally, in the embodiment, a specific model can be trained to detect a key point at the fingertip of an index finger, a key point at the second joint of a middle finger, and a key point at the palm of a human hand. As shown in FIG. 3, in step S202, a first distance d1 between a key point at the fingertip of the index finger and a key point at the palm in the key points of the hand is calculated; and in step S203, a second distance d2 between a key point at the second joint of the middle finger and the key point of the palm in the key points of the hand is calculated. If d1 and d2 satisfy a predetermined relationship, it is determined that the human hand has made a predetermined gesture, that is, a second target action, and in this case, the position of the key point at the fingertip of the index finger is determined as the display position of the second target action. Optionally, the predetermined relationship is:

$$d_1 > 1.5 * d_2.$$

That is to say, if d1 is greater than 1.5 times d2, it is determined that the human hand makes an action of stretching out the index finger, and in this case, the position of the key point at the fingertip of the index finger is obtained.

Optionally, after determining the display position of the second target action, it is determined whether a distance between the display position of the second target action and a position of a center point of the target object is less than a first distance threshold. The first distance threshold is a value of the size attribute of the target object, which can represent a distance between a center position of the target object and an edge of the target object. When the distance between the display position of the second target action and the position of the center point of the target object is less than the first distance threshold, it means that the display position corresponding to the second target action is located within the edge range of the target object. Exemplarily, if the target object is a bubble, with the first trigger condition, an effect of a bubble disappearing when a user pokes the bubble with an index finger can be realized.

Optionally, after the target object disappears completely, the display state attribute of the target object can be set to the hiding, to continue waiting for the appearance of the first target action, and re-trigger the generation process of the target object.

Optionally, the method for displaying an object in a video further comprises: a first object being presented in the target object, wherein the first object is formed by deforming a second object, the second object being an object in the video captured by the camera element. The second object is any object in the video. Exemplarily, the second object is a human face in the video, and the deformation is scaling and large-eyed processing. After detecting a human face in the video, the human face is cut out and is subjected to large-eyed processing, so that the eyes in the face are enlarged. Then, the face upon the large-eyed processing is scaled to adapt to the size of the target object, so as to obtain a deformed face, and the deformed face is then rendered in the target object. After presenting the first object within the target object, the first object moves, and/or rotates, and/or changes in size following the target object.

The present disclosure discloses a method and device for displaying an object in a video, an electronic device, and a computer-readable storage medium. The method for displaying an object in a video comprises: obtaining and displaying a video captured by a camera element; and displaying a generation process of a target object in the video based on a display position of a first target action in the video in response to detecting that the first target action appears in the video; wherein the generation process of the target object comprises: the target object appearing at the display position and changing from small to large. The above method solves the technical problem in the related art that the display effect of the special effect is fixed and the special effect cannot perform some changes or movements, thereby making the display effect of the special effect more flexible.

In the above description, although the steps of the above method embodiment are described in the order described above, it should be clear to those skilled in the art that the steps of the embodiment of the present disclosure are not necessarily executed in the above order, and may also be performed in other orders such as reverse order, parallel, crossover, etc. Moreover, on the basis of the above steps, those skilled in the art can add other steps, and these apparent modifications or equivalent alternatives should also be comprised within the protection scope of the present disclosure, which will not be repeated herein.

Figure 4:
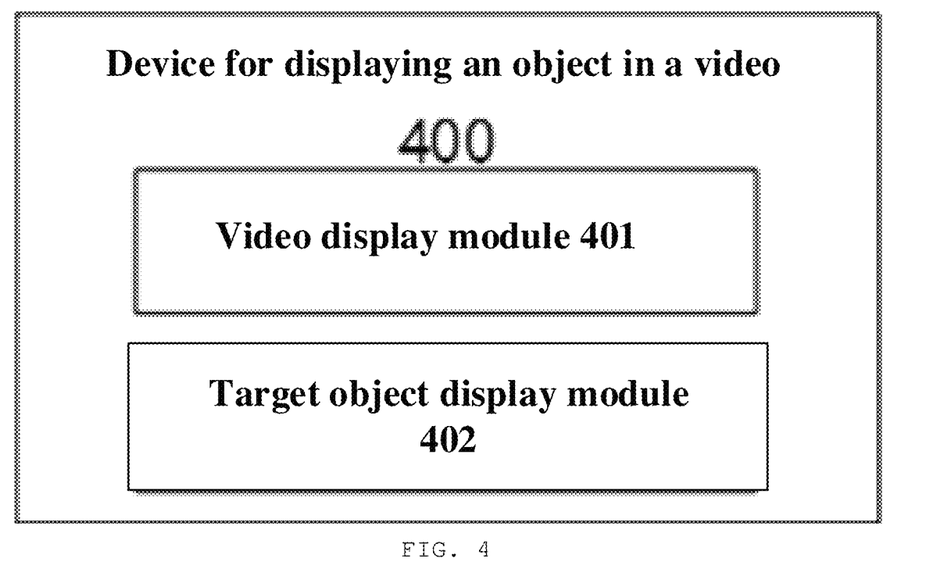
FIG. 4 is a schematic structural diagram of an device for displaying an object in a video provided by an embodiment of the present disclosure.

FIG. 4 is a schematic structural diagram of an device for displaying an object in a video provided by an embodiment of the present disclosure. As shown in FIG. 4, the device 400 comprises: a video display module 401 and a target object display module 402.

The video display module 401 is configured to obtain and display a video captured by a camera element.

The target object display module 402 is configured to display a generation process of a target object in the video based on a display position of a first target action in the video in response to detecting that the first target action appears in the video; wherein the generation process of the target object comprises: the target object appearing at the display position and changing from small to large.

Further, the generation process of the target object specifically comprises: the target object appearing at the display position of the first target action according to a first size threshold; and a size of the target object increasing from the first size threshold until the size of the target object reaching a second size threshold; wherein the first size threshold is less than the second size threshold.

Further, after the displaying of the generation process of the target object in the video, the target object display module 402 is further configured to display a motion process of the target object in the video; wherein the motion process of the target object comprises: the target object moving, and/or the target object rotating, and/or a size of the target object changing.

Further, the moving of the target object comprises: the target object moving the display position along a first linear trajectory, wherein the first linear trajectory is determined by a first movement speed and a first movement direction.

Further, the rotating of the target object comprises: the target object rotating along a first rotation trajectory, wherein the first rotation trajectory is determined by a first rotation direction and a first angular velocity.

Further, the changing of the size of the target object comprises: the size of the target object changing between a third size threshold and a fourth size threshold.

Further, the moving of the target object further comprises: the target object switching from the first linear trajectory to a second linear trajectory to move the display position in response to the target object colliding with an edge of the video, wherein the second linear trajectory is determined by a second movement speed and a second movement direction.

Further, the rotating of the target object comprises: the target object switching from the first rotation trajectory to a second rotation trajectory for rotation in response to the target object colliding with an edge of the video, wherein the second rotation trajectory is determined by a second rotation direction and a second angular velocity.

Further, the target object display module 402 is further configured to display a disappearance process of the target object in the video in response to detecting a first trigger condition.

Further, the displaying of the disappearance process of the target object in the video comprises: obtaining a disappearance sequence frame of the target object; playing the disappearance sequence frame in the video; and making the target object disappear from the video when the playing of the disappearance sequence frame is finished.

Further, the first trigger condition is that a second target action appears in the video, wherein a display position of the second target action in the video is within a display range of the target object.

Further, the target object display module 402 is further configured to: detect key points of a hand in the video; calculate a first distance between a key point at a fingertip of an index finger and a key point at a palm in the key points of the hand; calculate a second distance between a key point at a second joint of a middle finger and the key point at the palm in the key points of the hand; and determine that the second target action is detected, and determine a position of the key point at the fingertip of the index finger as the display position of the second target action in response to the first distance and the second distance satisfying a predetermined relationship.

Further, the generation process of the target object further comprises: a first object being presented in the target object, wherein the first object is formed by deforming a second object, the second object being an object in the video captured by the camera element.

The device shown in FIG. 4 may execute the method of the embodiments shown in FIG. 1 to FIG. 3. For the parts not described in detail in this embodiment, reference may be made to the related description of the embodiments shown in FIG. 1 to FIG. 3. For the execution process and technical effects of the technical solution, reference may be made to the description of the embodiments shown in FIG. 1 to FIG. 3, which will not be repeated herein.

Figure 5:
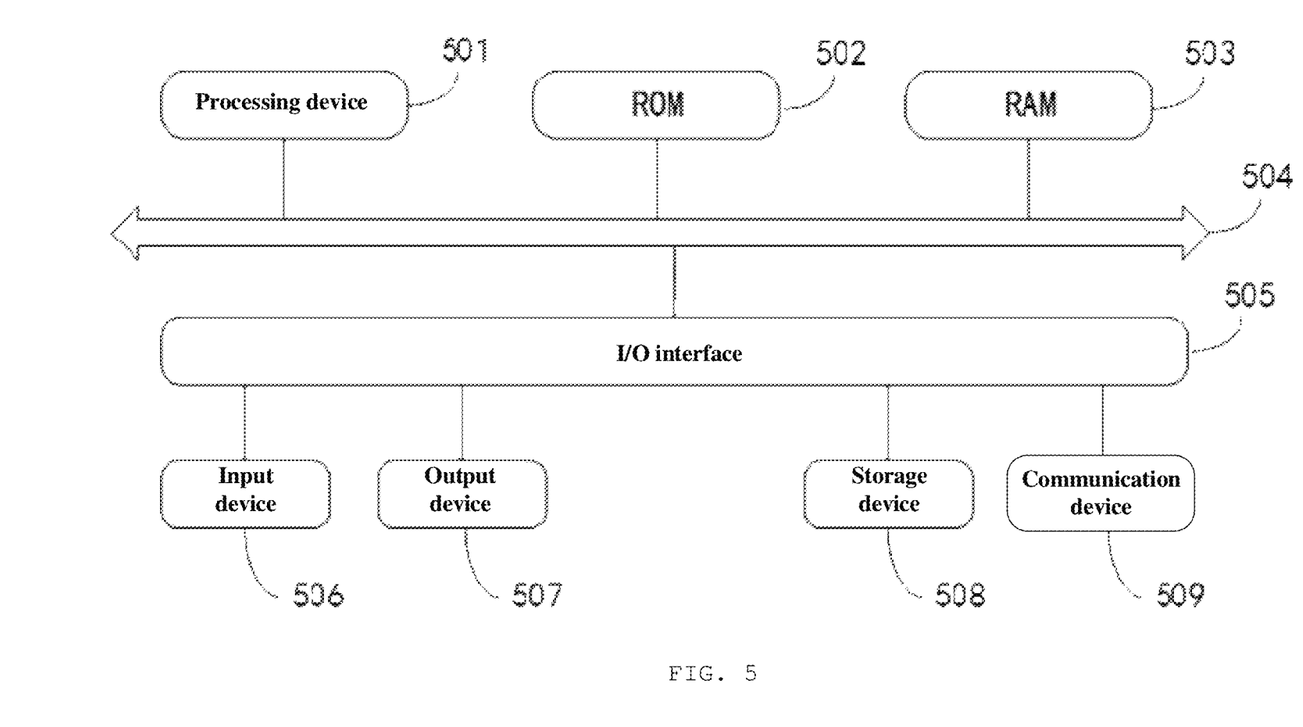
FIG. 5 is a schematic structural diagram of an electronic device provided according to an embodiment of the present disclosure.

Referring now to FIG. 5, a structural diagram of an electronic device (e.g., a terminal device or server shown in FIG. 1) 500 suitable for implementing an embodiment of the present disclosure is shown. The terminal device of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, and the like. The electronic device shown in FIG. 5 is merely an example and should not impose any limitation on the function and scope of the embodiment of the present disclosure.

As shown in FIG. 5, the electronic device 500 may comprise a processing device (e.g., a central processing unit, a graphics processor) 501, which may perform various appropriate actions and processes according to a program stored in Read Only Memory (ROM) 502 or a program loaded from storage device 508 into Random Access Memory (RAM) 503. In RAM 503, various programs and data required for the operation of the electronic device 500 are also stored. Processing device 501, ROM 502 and RAM 503 are connected to each other through bus 504. Input/Output (I/O) interface 505 is also connected to bus 504.

Generally, the following devices can be connected to I/O interface 505: an input device 506 comprising, for example, a touch screen, a touch pad, a keyboard, a mouse, a camera, a microphone, an accelerometer, a gyroscope, etc.; an output device 507 comprising, for example, a liquid crystal display (LCD), a speaker, a vibrator, etc.; a storage device 508 comprising, for example, a magnetic tape, a hard disk, etc.; and a communication device 509. The communication device 509 enables the electronic device 500 to communicate wirelessly or by wire with other devices to exchange data. Although FIG. 5 shows the electronic device 500 with various components, it should be understood that it is not required to implement or have all of these components. Alternatively, more or fewer components can be implemented or provided.

In particular, according to an embodiment of the present disclosure, the processes described above with reference to the flowchart can be implemented as a computer software program. For example, an embodiment of the present disclosure comprises a computer program product, which comprises a computer program carried on a non-transitory computer readable medium, the computer program containing program code for executing the method shown in the flowchart. In such an embodiment, the computer program may be downloaded and installed from the network through the communication device 509, or installed from the storage device 508, or from the ROM 502. When the computer program is executed by the processing device 501, the above functions defined in the method of the embodiment of the present disclosure are performed.

It should be noted that the computer-readable medium in the present disclosure may be a computer-readable signal medium or a computer-readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, wherein the program can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wire, optic cable, RF (radio frequency), etc., or any suitable combination of the foregoing.

In some embodiments, a client and a server can communicate using any currently known or future developed network protocol such as HTTP (HyperText Transfer Protocol), and can be interconnected by any form or medium of digital data communication, e.g., a communication network. Examples of communication networks comprise a local area network ("LAN") and a wide area network ("WAN"), the Internet, and end-to-end networks (for example, ad hoc end-to-end networks), as well as any currently known or future developed networks.

The above computer-readable medium may be comprised in the electronic device described above; or it may exist alone without being assembled into the electronic device.

The computer-readable medium carries one or more programs that cause, when executed by the electronic device, the electronic device to obtain and display a video captured by a camera element; and display a generation process of a target object in the video based on a display position of a first target action in the video in response to detecting that the first target action appears in the video; wherein the generation process of the target object comprises: the target object appearing at the display position and changing from small to large.

The computer program code for executing operations of the present disclosure may be written in one or more program design languages or combinations thereof, the program design languages comprising, but being not limited to, object-oriented program design languages, such as Java, Smalltalk, C++, etc., as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the case of a remote computer, the remote computer may be connected to the user computer through various kinds of networks, comprising local area network (LAN) or wide area network (WAN), or connected to external computer (for example using an internet service provider via Internet).

The flowcharts and block diagrams in the accompanying drawings illustrate the architecture, functionality, and operation of systems, methods and computer program products according to various embodiments of the present disclosure. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may be executed substantially in parallel, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments described in the present disclosure can be implemented in software or hardware. Wherein, the names of the units do not constitute a limitation on the units themselves under certain circumstances.

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash memory), fiber optics, portable compact disk read only memory (CD-ROM), optical storage device, magnetic storage device, or any suitable combination of the foregoing.

An embodiment of the present disclosure further provides a computer program product, comprising a computer program, which, when executed, is used to implement the method of displaying an object in a video provided by the embodiment of the present disclosure.

According to one or more embodiments of the present disclosure, a method for displaying an object in a video is provided, comprising: obtaining and displaying a video captured by a camera element; and displaying a generation process of a target object in the video based on a display position of a first target action in the video in response to detecting that the first target action appears in the video; wherein the generation process of the target object comprises: the target object appearing at the display position and changing from small to large.

Further, the generation process of the target object comprises: the target object appearing at the display position of the first target action according to a first size threshold; and a size of the target object increasing from the first size threshold until the size of the target object reaching a second size threshold; wherein the first size threshold is less than the second size threshold.

Further, after the displaying of the generation process of the target object in the video, the method further comprises: displaying a motion process of the target object in the video; wherein the motion process of the target object comprises: the target object moving, and/or the target object rotating, and/or a size of the target object changing.

Further, the moving of the target object comprises: the target object moving the display position along a first linear trajectory, wherein the first linear trajectory is determined by a first movement speed and a first movement direction.

Further, the rotating of the target object comprises: the target object rotating along a first rotation trajectory, wherein the first rotation trajectory is determined by a first rotation direction and a first angular velocity.

Further, the changing of the size of the target object comprises: the size of the target object changing between a third size threshold and a fourth size threshold.

Further, the moving of the target object further comprises: the target object switching from the first linear trajectory to a second linear trajectory to move the display position in response to the target object colliding with an edge of the video, wherein the second linear trajectory is determined by a second movement speed and a second movement direction.

Further, the rotating of the target object comprises: the target object switching from the first rotation trajectory to a second rotation trajectory for rotation in response to the target object colliding with an edge of the video, wherein the second rotation trajectory is determined by a second rotation direction and a second angular velocity.

Further, the method further comprises: displaying a disappearance process of the target object in the video in response to detecting a first trigger condition.

Further, the displaying of the disappearance process of the target object in the video comprises: obtaining a disappearance sequence frame of the target object; playing the disappearance sequence frame in the video; and making the target object disappear from the video when the playing of the disappearance sequence frame is finished.

Further, the first trigger condition is that a second target action appears in the video, wherein a display position of the second target action in the video is within a display range of the target object.

Further, the method for displaying an object in a video further comprises: detecting key points of a hand in the video; calculating a first distance between a key point at a fingertip of an index finger and a key point at a palm in the key points of the hand; calculating a second distance between a key point at a second joint of a middle finger and the key point at the palm in the key points of the hand; and determining that the second target action is detected, and determining a position of the key point at the fingertip of the index finger as the display position of the second target action in response to the first distance and the second distance satisfying a predetermined relationship.

Further, a first object is presented in the target object, wherein the first object is formed by deforming a second object, the second object being an object in the video captured by the camera element.

According to one or more embodiments of the present disclosure, an device for displaying an object in a video is provided, comprising: a video display module configured to obtain and display a video captured by a camera element; and a target object display module configured to display a generation process of a target object in the video based on a display position of a first target action in the video in response to detecting that the first target action appears in the video; wherein the generation process of the target object comprises: the target object appearing at the display position and changing from small to large.

Further, the generation process of the target object comprises: the target object appearing at the display position of the first target action according to a first size threshold; and a size of the target object increasing from the first size threshold until the size of the target object reaching a second size threshold; wherein the first size threshold is less than the second size threshold.

Further, after the displaying of the generation process of the target object in the video, the target object display module is further configured to display a motion process of the target object in the video; wherein the motion process of the target object comprises: the target object moving, and/or the target object rotating, and/or a size of the target object changing.

Further, the moving of the target object comprises: the target object moving the display position along a first linear trajectory, wherein the first linear trajectory is determined by a first movement speed and a first movement direction.

Further, the rotating of the target object comprises: the target object rotating along a first rotation trajectory, wherein the first rotation trajectory is determined by a first rotation direction and a first angular velocity.

Further, the changing of the size of the target object comprises: the size of the target object changing between a third size threshold and a fourth size threshold.

Further, the moving of the target object further comprises: the target object switching from the first linear trajectory to a second linear trajectory to move the display position in response to the target object colliding with an edge of the video, wherein the second linear trajectory is determined by a second movement speed and a second movement direction.

Further, the rotating of the target object comprises: the target object switching from the first rotation trajectory to a second rotation trajectory for rotation in response to the target object colliding with an edge of the video, wherein the second rotation trajectory is determined by a second rotation direction and a second angular velocity.

Further, the target object display module is further configured to display a disappearance process of the target object in the video in response to detecting a first trigger condition.

Further, the displaying of the disappearance process of the target object in the video comprises: obtaining a disappearance sequence frame of the target object; playing the disappearance sequence frame in the video; and making the target object disappear from the video when the playing of the disappearance sequence frame is finished.

Further, the first trigger condition is that a second target action appears in the video, wherein a display position of the second target action in the video is within a display range of the target object.

Further, the target object display module is further configured to: detect key points of a hand in the video; calculate a first distance between a key point at a fingertip of an index finger and a key point at a palm in the key points of the hand; calculate a second distance between a key point at a second joint of a middle finger and the key point at the palm in the key points of the hand; and determine that the second target action is detected, and determine a position of the key point at the fingertip of the index finger as the display position of the second target action in response to the first distance and the second distance satisfying a predetermined relationship.

Further, the generation process of the target object further comprises: a first object being presented in the target object, wherein the first object is formed by deforming a second object, the second object being an object in the video captured by the camera element.

According to one or more embodiments of the present disclosure, an electronic device is provided, comprising: at least one processor; and a memory coupled in communication with the at least one processor; wherein the memory stores instructions executable by the at least one processor, the instructions when executed by the at least one processor causing the at least one processor to perform any aforementioned method for displaying an object in a video.

According to one or more embodiments of the present disclosure, a non-transitory computer-readable storage medium is provided, wherein the non-transitory computer-readable storage medium stores computer instructions used to cause a computer to execute any aforementioned method for displaying an object in a video.

According to one or more embodiments of the present disclosure, a computer program product is provided, comprising a computer program, which, when executed, is used to implement the method of displaying an object in a video provided by the embodiment of the present disclosure.

The above description is merely embodiments of the present disclosure and illustrates technical principles applied in the present disclosure. Those skilled in the art should understand that the scope of disclosure involved in the disclosure is not limited to the technical solutions formed by the specific combination of the above technical features, and should also cover other technical solutions formed by any combination of the above technical features or their equivalent features without departing from the concept of the present disclosure. For example, technical solutions formed by replacing the above features with technical features having similar functions to those disclosed in the present disclosure (but not limited to).

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A method for displaying an object in a video, comprising:
    obtaining and displaying a video captured by a camera element; and
    displaying a generation process of a target object in the video based on a display position of a first target action in the video in response to detecting that the first target action appears in the video, wherein the first target action is displayed in the video;
    wherein the generation process of the target object comprises:
    the target object appearing at the display position of the first target action according to a first size threshold; and
    a size of the target object increasing from the first size threshold until the size of the target object reaching a second size threshold,
    wherein the first size threshold is less than the second size threshold;
    the method further comprising: displaying a disappearance process of the target object in the video in response to detecting a first trigger condition, wherein the first trigger condition is that a second target action appears in the video, wherein a display position of the second target action in the video is within a display range of the target object, the second target action is an action of stretching out an index finger in the video, and the display position of the second target action is a position of a fingertip of the index finger, wherein the first trigger condition is detected in a case where the position of the fingertip of the index finger is within the display range of the target object; and
    the method further comprising: determining whether the display position of the fingertip of the index finger of the second target action in the video is within the display range of the target object;
    wherein the determining of whether the display position of the fingertip of the index finger of the second target action in the video is within the display range of the target object comprises:
    after determining the display position of the fingertip of the index finger of the second target action, determining whether a distance between the display position of the fingertip of the index finger of the second target action and a position of a center point of the target object is less than a first distance threshold, wherein the first distance threshold is a value of a distance between a center position of the target object and an edge of the target object; and
    if the distance between the display position of the fingertip of the index finger of the second target action and the position of the center point of the target object is less than the first distance threshold, determining that the display position of the fingertip of the index finger of the second target action in the video is within the display range of the target object;
    wherein the displaying of the disappearance process of the target object in the video comprises: obtaining a disappearance sequence frame of the target object, wherein the disappearance sequence frame comprises a sequence of video frames; playing the disappearance sequence frame in the video, wherein the playing of the disappearance sequence frame in the video comprises: controlling a transparency of the target object according to a playback time length of the disappearance sequence frame, wherein the transparency of the target object gradually increases with playback of the disappearance sequence frame; and making the target object become completely transparent and disappear from the video when the playing of the disappearance sequence frame is finished.

2. The method for displaying an object in a video according to claim 1, after the displaying of the generation process of the target object in the video, further comprising:
displaying a motion process of the target object in the video;
wherein the motion process of the target object comprises: the target object moving, and/or the target object rotating, and/or a size of the target object changing.

3. The method for displaying an object in a video according to claim 2, wherein the moving of the target object comprises:
the target object moving the display position along a first linear trajectory, wherein the first linear trajectory is determined by a first movement speed and a first movement direction.

4. The method for displaying an object in a video according to claim 2, wherein the rotating of the target object comprises:
the target object rotating along a first rotation trajectory, wherein the first rotation trajectory is determined by a first rotation direction and a first angular velocity.

5. The method for displaying an object in a video according to claim 2, wherein the changing of the size of the target object comprises:
the size of the target object changing between a third size threshold and a fourth size threshold.

6. The method for displaying an object in a video according to claim 3, wherein the moving of the target object further comprises:
the target object switching from the first linear trajectory to a second linear trajectory to move the display position in response to the target object colliding with an edge of the video, wherein the second linear trajectory is determined by a second movement speed and a second movement direction.

7. The method for displaying an object in a video according to claim 4, wherein the rotating of the target object comprises:
the target object switching from the first rotation trajectory to a second rotation trajectory for rotation in response to the target object colliding with an edge of the video, wherein the second rotation trajectory is determined by a second rotation direction and a second angular velocity.

8. The method for displaying an object in a video according to claim 1, further comprising:
detecting key points of a hand in the video;
calculating a first distance between a key point at a fingertip of an index finger and a key point at a palm in the key points of the hand;
calculating a second distance between a key point at a second joint of a middle finger and the key point at the palm in the key points of the hand; and
determining that the second target action is detected, and determining a position of the key point at the fingertip of the index finger as the display position of the second target action in response to the first distance and the second distance satisfying a predetermined relationship.

9. The method for displaying an object in a video according to claim 1, wherein a first object is presented in the target object, wherein the first object is formed by deforming a second object, the second object being an object in the video captured by the camera element.

10. An electronic device, comprising:
a memory configured to store computer-readable instructions; and
a processor configured to execute the computer-readable instructions, to cause the processor to:
obtain and display a video captured by a camera element; and
display a generation process of a target object in the video based on a display position of a first target action in the video in response to detecting that the first target action appears in the video, wherein the first target action is displayed in the video;
wherein the generation process of the target object comprises:
the target object appearing at the display position of the first target action according to a first size threshold; and
a size of the target object increasing from the first size threshold until the size of the target object reaching a second size threshold, wherein the first size threshold is less than the second size threshold;
wherein the processor is further configured to execute the computer-readable instructions, to cause the processor to: display a disappearance process of the target object in the video in response to detecting a first trigger condition, wherein the first trigger condition is that a second target action appears in the video, wherein a display position of the second target action in the video is within a display range of the target object, the second target action is an action of stretching out an index finger in the video, and the display position of the second target action is a position of a fingertip of the index finger, wherein the first trigger condition is detected in a case where the position of the fingertip of the index finger is within the display range of the target object; and
the processor is further configured to execute the computer-readable instructions, to cause the processor to:
after determining the display position of the fingertip of the index finger of the second target action, determine whether a distance between the display position of the fingertip of the index finger of the second target action and a position of a center point of the target object is less than a first distance threshold, wherein the first distance threshold is a value of a a distance between a center position of the target object and an edge of the target object; and
if the distance between the display position of the fingertip of the index finger of the second target action and the position of the center point of the target object is less than the first distance threshold, determine that the display position of the fingertip of the index finger of the second target action in the video is within the display range of the target object;
wherein the displaying of the disappearance process of the target object in the video comprises: obtaining a disappearance sequence frame of the target object, wherein the disappearance sequence frame comprises a sequence of video frames; playing the disappearance sequence frame in the video, wherein the playing of the disappearance sequence frame in the video comprises: controlling a transparency of the target object according to a playback time length of the disappearance sequence frame, wherein the transparency of the target object gradually increases with playback of the disappearance sequence frame; and making the target object become completely transparent and disappear from the video when the playing of the disappearance sequence frame is finished.

11. A non-transitory computer-readable storage medium on which computer-readable instructions are stored, which when executed by a computer cause the computer to:
  obtain and display a video captured by a camera element; and
  display a generation process of a target object in the video based on a display position of a first target action in the video in response to detecting that the first target action appears in the video, wherein the first target action is displayed in the video;
  wherein the generation process of the target object comprises:
  the target object appearing at the display position of the first target action according to a first size threshold; and
  a size of the target object increasing from the first size threshold until the size of the target object reaching a second size threshold,
  wherein the first size threshold is less than the second size threshold;
  wherein the computer-readable instructions, when executed by the computer, further cause the computer to: display a disappearance process of the target object in the video in response to detecting a first trigger condition, wherein the first trigger condition is that a second target action appears in the video, wherein a display position of the second target action in the video is within a display range of the target object, the second target action is an action of stretching out an index finger in the video, and the display position of the second target action is a position of a fingertip of the index finger, wherein the first trigger condition is detected in a case where the position of the fingertip of the index finger is within the display range of the target object; and
  the computer-readable instructions, when executed by the computer, further cause the computer to:
  after determining the display position of the fingertip of the index finger of the second target action, determine whether a distance between the display position of the fingertip of the index finger of the second target action and a position of a center point of the target object is less than a first distance threshold, wherein the first distance threshold is a value of a distance between a center position of the target object and an edge of the target object; and
  if the distance between the display position of the fingertip of the index finger of the second target action and the position of the center point of the target object is less than the first distance threshold, determine that the display position of the fingertip of the index finger of the second target action in the video is within the display range of the target object;
  wherein the displaying of the disappearance process of the target object in the video comprises: obtaining a disappearance sequence frame of the target object, wherein the disappearance sequence frame comprises a sequence of video frames; playing the disappearance sequence frame in the video, wherein the playing of the disappearance sequence frame in the video comprises: controlling a transparency of the target object according to a playback time length of the disappearance sequence frame, wherein the transparency of the target object gradually increases with playback of the disappearance sequence frame; and making the target object become completely transparent and disappear from the video when the playing of the disappearance sequence frame is finished.

* * * * *